United States Patent [19]

Insolio

[11] 3,718,268
[45] Feb. 27, 1973

[54] MACHINE FOR FEEDING, SCORING, AND BREAKING SMALL DIAMETER GLASS TUBING

[75] Inventor: Thomas A. Insolio, Bristol, Conn.

[73] Assignee: The Fletcher-Terry Company, Forestville, Conn.

[22] Filed: July 12, 1971

[21] Appl. No.: 161,724

[52] U.S. Cl. .................................. 225/2, 225/96.5
[51] Int. Cl. .............................................. B26f 3/00
[58] Field of Search ............................ 225/96.5, 2

[56] References Cited

UNITED STATES PATENTS

| | | | |
|---|---|---|---|
| 921,979 | 5/1909 | Graybill | 225/96.5 |
| 2,051,698 | 8/1936 | Gaskell | 225/96.5 |
| 2,304,926 | 12/1942 | Juvinall | 225/2 |

Primary Examiner—Frank T. Yost
Attorney—Roger B. McCormick et al.

[57] ABSTRACT

The tubing to be cut is placed on a flat bed, relatively long-lengths of tubing being arranged in side-by-side relationship so as to fill the entire width of the bed. Tube feeding means is provided above the bed to feed the tubing across an anvil at the downstream end of the bed and up against a measuring bar or stop. The stop is spaced a predetermined distance downstream of the anvil, being adjustable to permit cutting the tubing to the desired length. A scoring wheel and break-off shoe are provided in a carriage, which carriage traverses the bed over the anvil while the tube feeding means clamps the tubing. The feeding and clamping function are automatically provided for and control circuitry is utilized to control these functions as well as to successively complete a predetermined sequence of these feeding and scoring and clamping functions.

10 Claims, 20 Drawing Figures

INVENTOR.
THOMAS A. INSOLIO

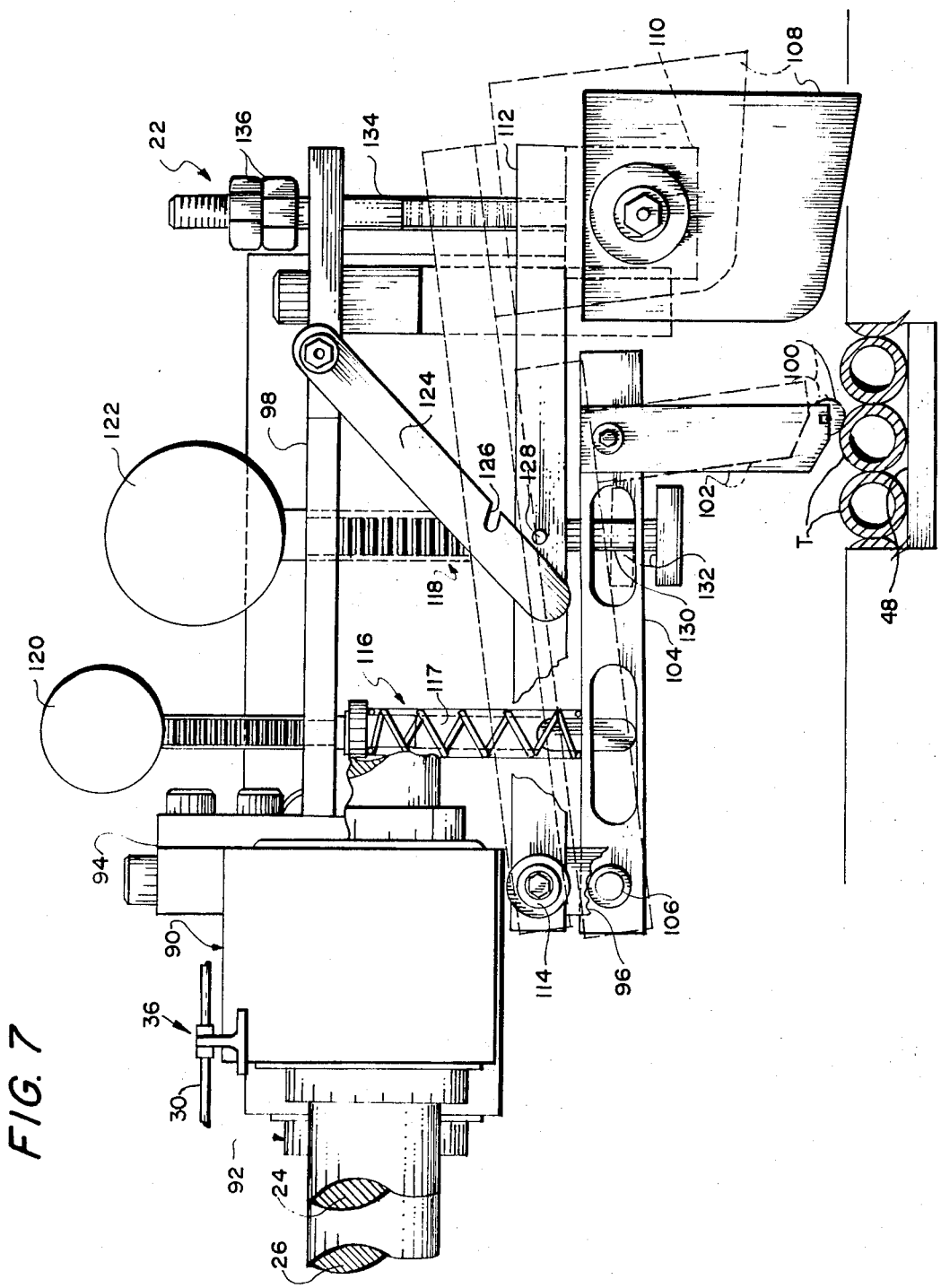

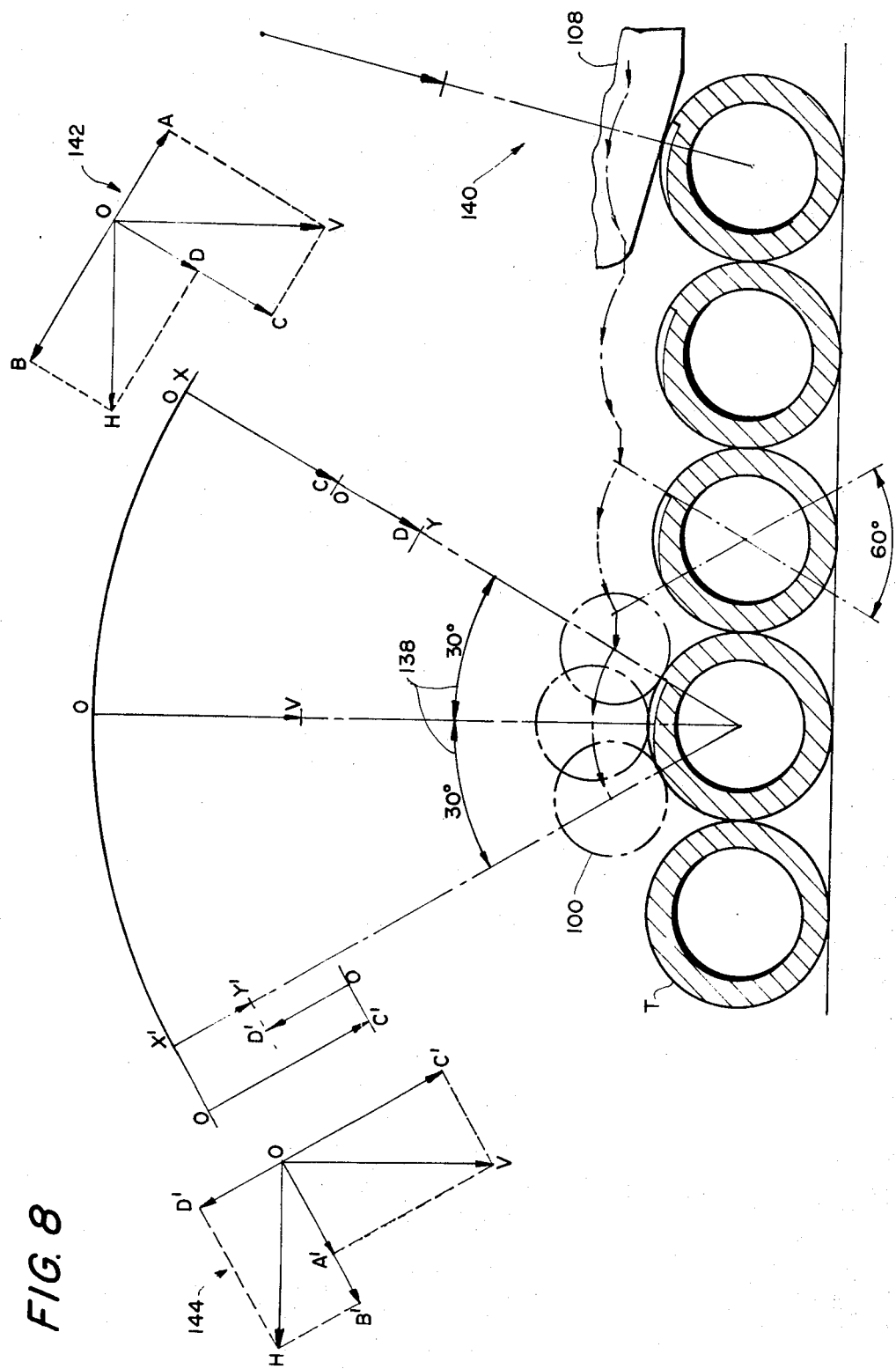

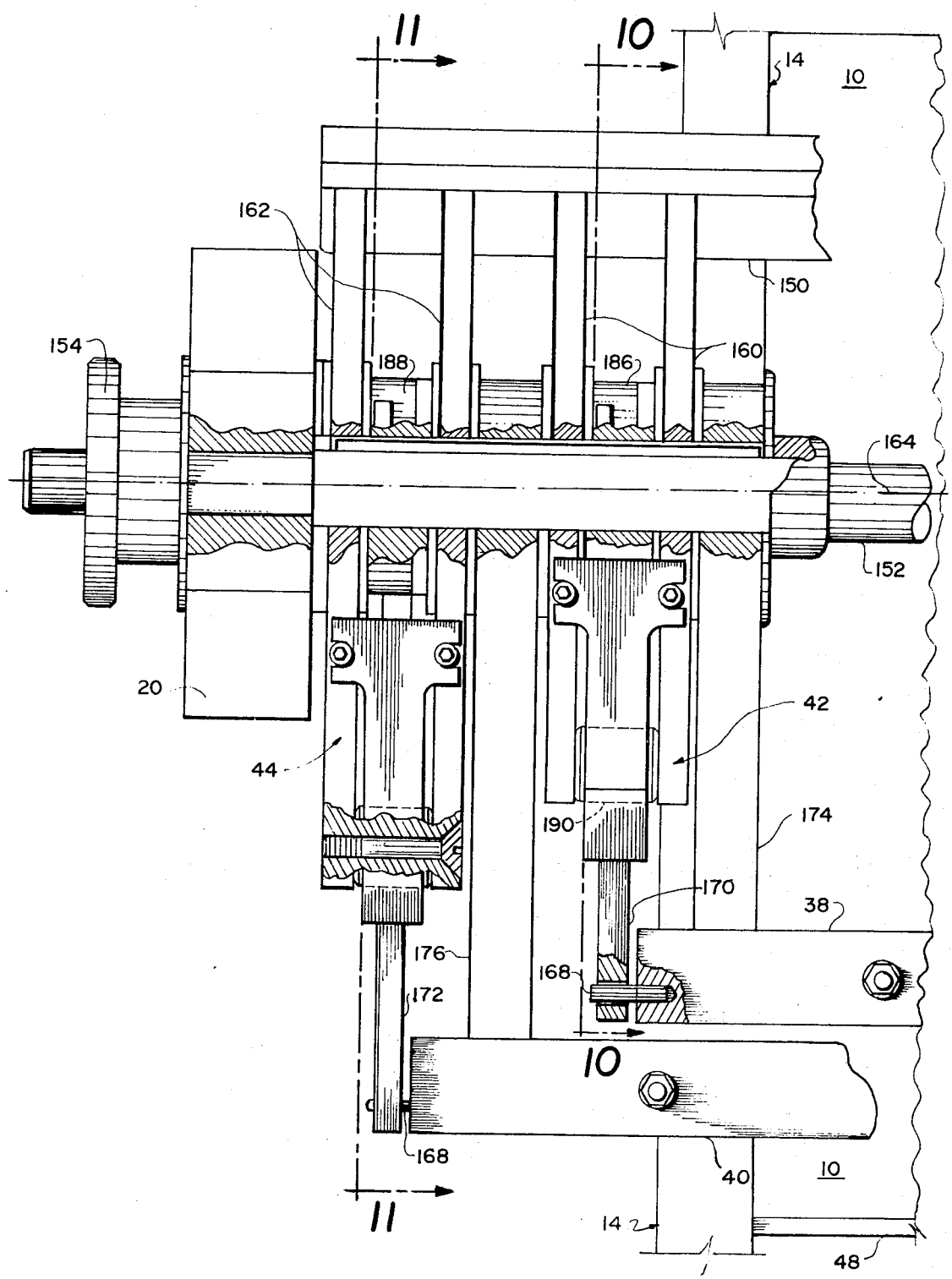

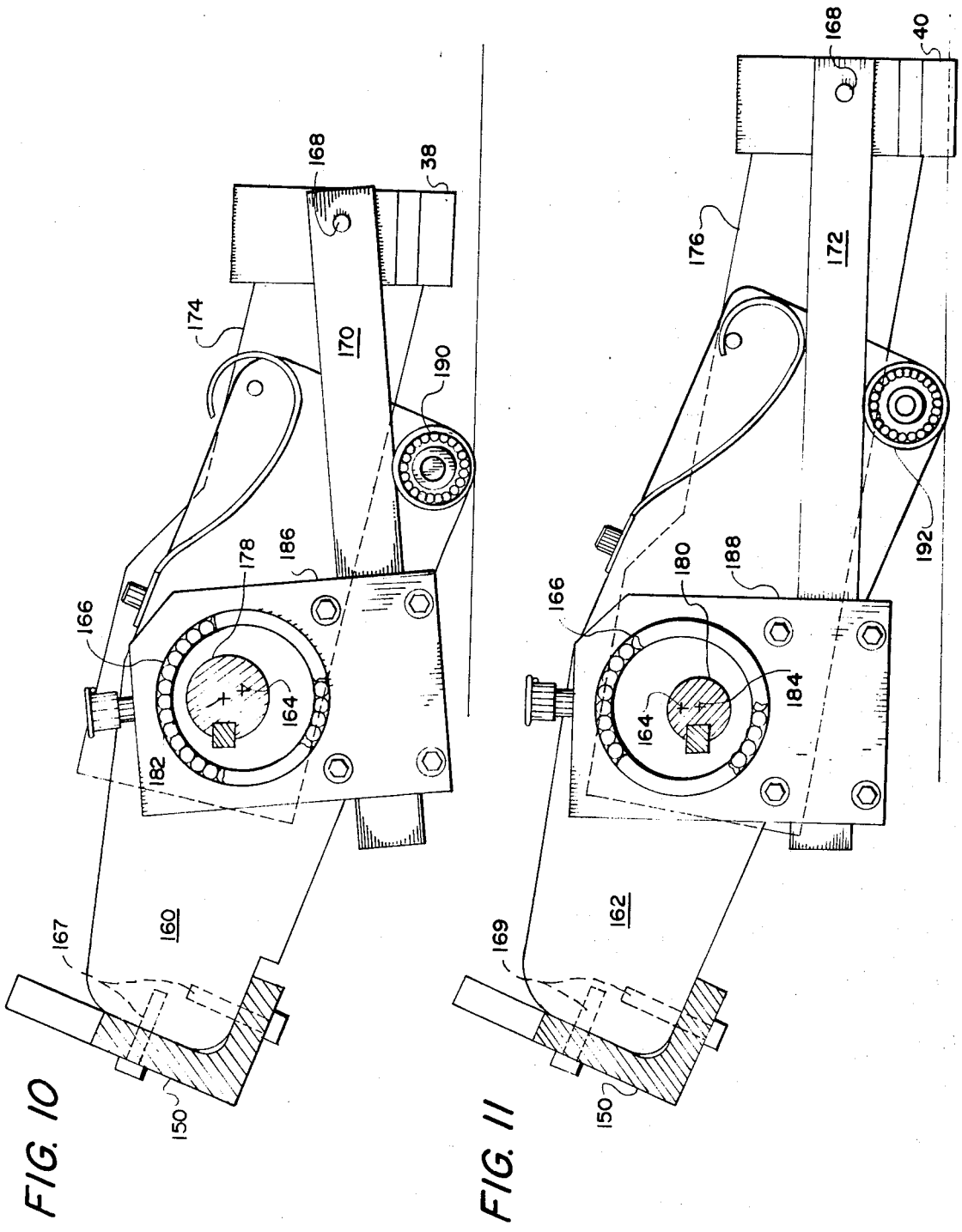

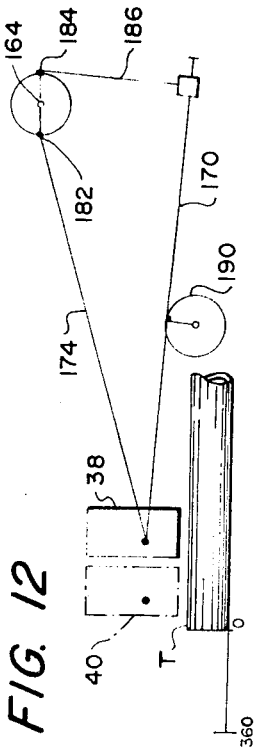
FIG. 12
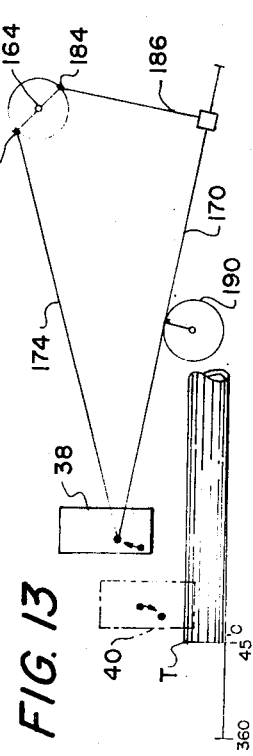
FIG. 13
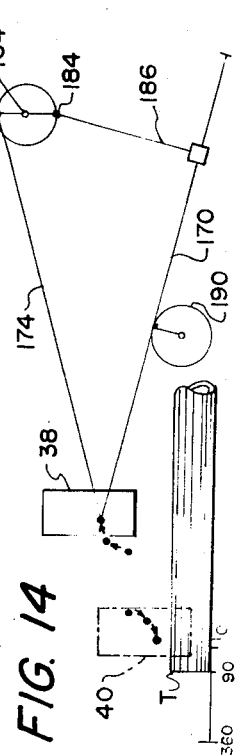
FIG. 14
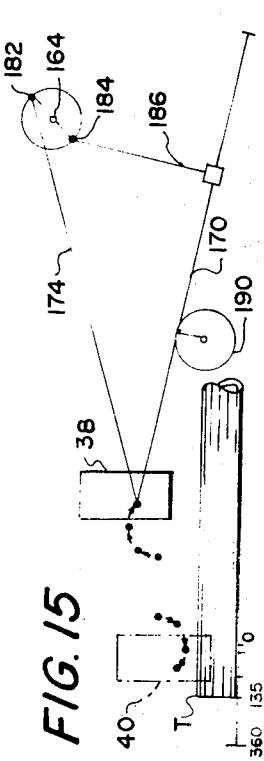
FIG. 15
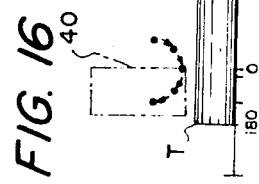
FIG. 16
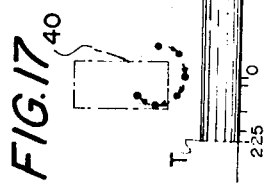
FIG. 17
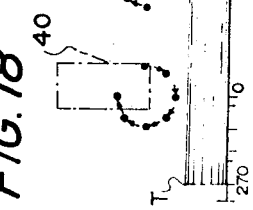
FIG. 18
FIG. 19

MACHINE FOR FEEDING, SCORING, AND BREAKING SMALL DIAMETER GLASS TUBING

SUMMARY OF THE INVENTION

This invention relates generally to machines for handling a plurality of relatively long lengths of glass tubing and cutting these into segments of predetermined length. More particularly, a machine is disclosed for feeding, scoring and breaking small diameter glass tubing, and the machine has an automatic mode of operation. A horizontal bed is provided for receiving a plurality of these tubing lengths in side-by-side relationship, generally between edge guides provided on either side of the bed. An anvil is provided at the downstream end of the bed, and a carriage is adapted to traverse the bed generally above the anvil so as to pass a scoring wheel and breakoff shoe across the tubes, after they have been fed automatically by feed bars downstream against a measuring bar or stop. Control circuitry is provided for timing the feed bars, and the carriage traversing means, to move the carriage in a return direction when the glass members are being fed toward this stop, and said feed bars also serve to clamp the tubing during movement of the carriage in its scoring and breaking direction. The stop means is moved to an inactive position during movement of the carriage in its scoring and breaking direction to provide clearance between it and the segments being severed.

BRIEF DESCRIPTION OF THE DRAWINGS

FIG. 7 is an enlarged view of the carriage shown in elevation in FIG. 2.

FIG. 8 is a schematic view of several of the glass tubes, and shows the depth of cut achieved by the scoring wheel as well as force diagrams which show the variation in cutting force and its effect on the geometry of the cut.

FIG. 9 is a plan view showing one end of the mechanism for supporting the feed bars, being an enlargement of that portion of the FIG. 1 apparatus showing the feed bar supporting means.

FIG. 10 is a sectional view taken on line 10—10 of FIG. 9.

FIG. 11 is a sectional view taken on line 11—11 of FIG. 9.

FIGS. 12—19, inclusively, show the mode of operation of the feed bars shown in FIGS. 10 and 11, and illustrate the sequence of operation of one of the feed bars as it cooperates with the other to feed the tubes downstream across the anvil.

DETAILED DESCRIPTION

Figure 1:
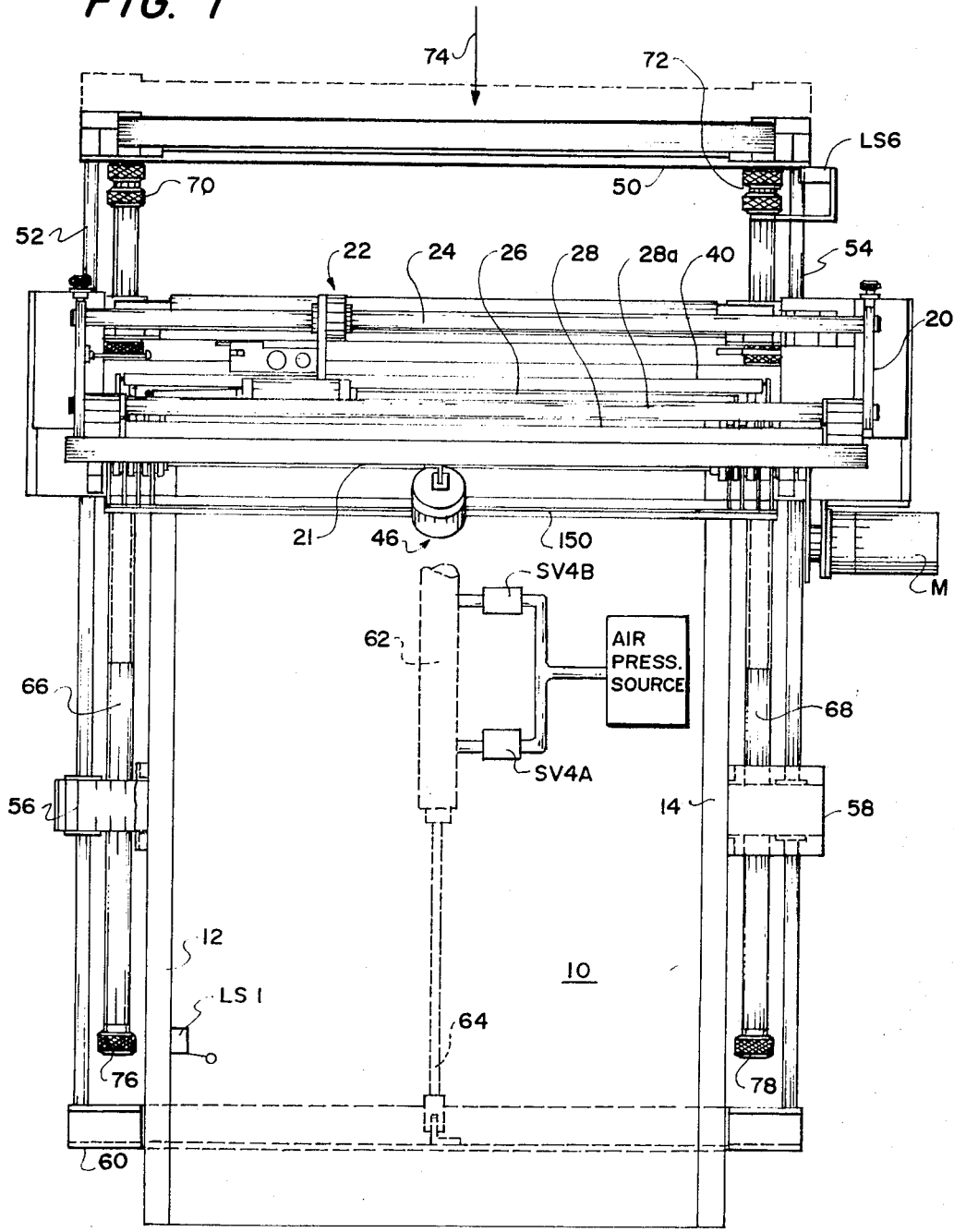
FIG. 1 is a plan view of the overall machine, showing the measuring bar or stop in an extended or inactive position in broken lines, and in its active or stop position in solid lines.
Figure 2:
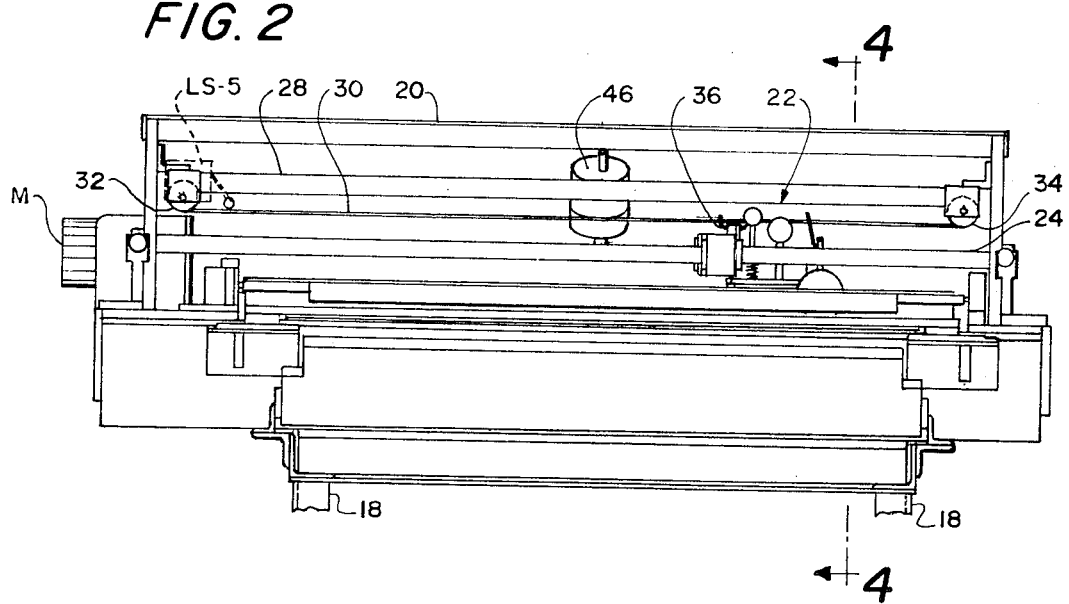
FIG. 2 is an end view of the machine of FIG. 1, looking in the upstream direction.
Figure 3:
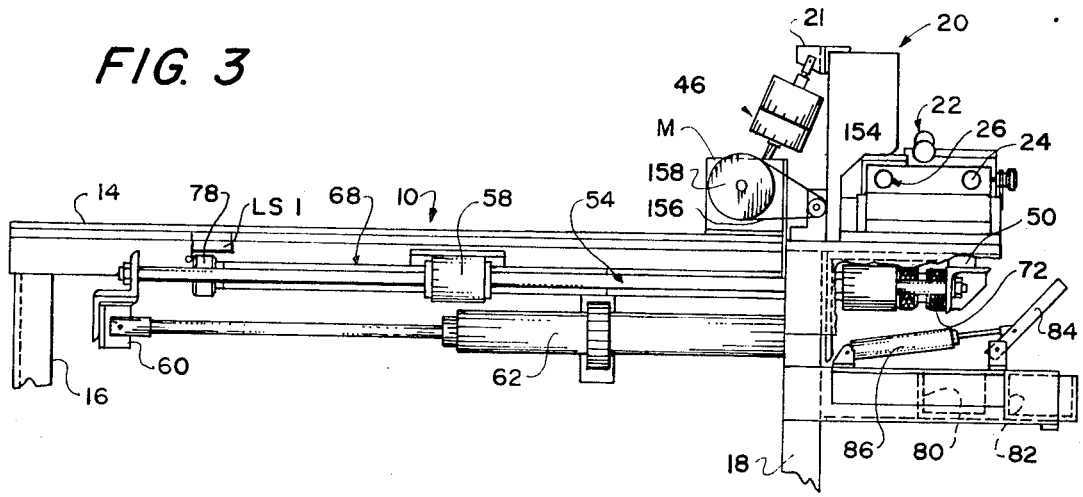
FIG. 3 is a side elevational view of the machine of FIG. 1.

Turning now to a more detailed description of the drawings, FIGS. 1, 2 and 3 show in plan view, end view and side elevation the overall construction of the machine. A generally horizontally extending bed or table 10 is provided with longitudinally extending side guides 12 and 14 for supporting a plurality of lengths of tubing to be cut into segments of predetermined length, the tubing being omitted from these views for clarity. The bed 10 is supported or rear and front legs, 16 and 18 respectively, and a bridge structure, indicated generally at 20, is provided immediately above the front legs 18 and includes fixed rods 24 and 26 for supporting a traversing carriage 22 to be described in greater detail hereinafter. The carriage 22 is slidably supported on the guide rods 24 and 26, and a cable-type air driven actuator 28 is provided for traversing the carriage in at least one direction, said actuator 18 being provided with a spring return for returning the carriage in the opposite direction.

The cable-type actuator is of conventional construction and comprises a piston (not shown) slidably received in the tubular housing 28, and connected to a cable 30 which travels over pulleys, provided at either end of the bridge structure 20 and indicated generally at 32 and 34. The carriage 22 is connected to the lower run of the cable 30 as indicated generally at 36, with the upper run of said cable traveling within the tube 28 and being connected to the above-mentioned piston. As so constructed and arranged the carriage 22 is adapted to travel from its start of position SOC at the right-hand side of FIG. 2 and at the left-hand side of FIG. 1 to its end of cut position EOC at the left-hand side of FIG. 2 and the right-hand side of FIG. 1. As described in greater detail hereinbelow, the carriage is air operated from the end of cut EOC to the start of cut SOC position and spring returned from the start of cut SOC to the end of cut EOC position.

Figure 4:
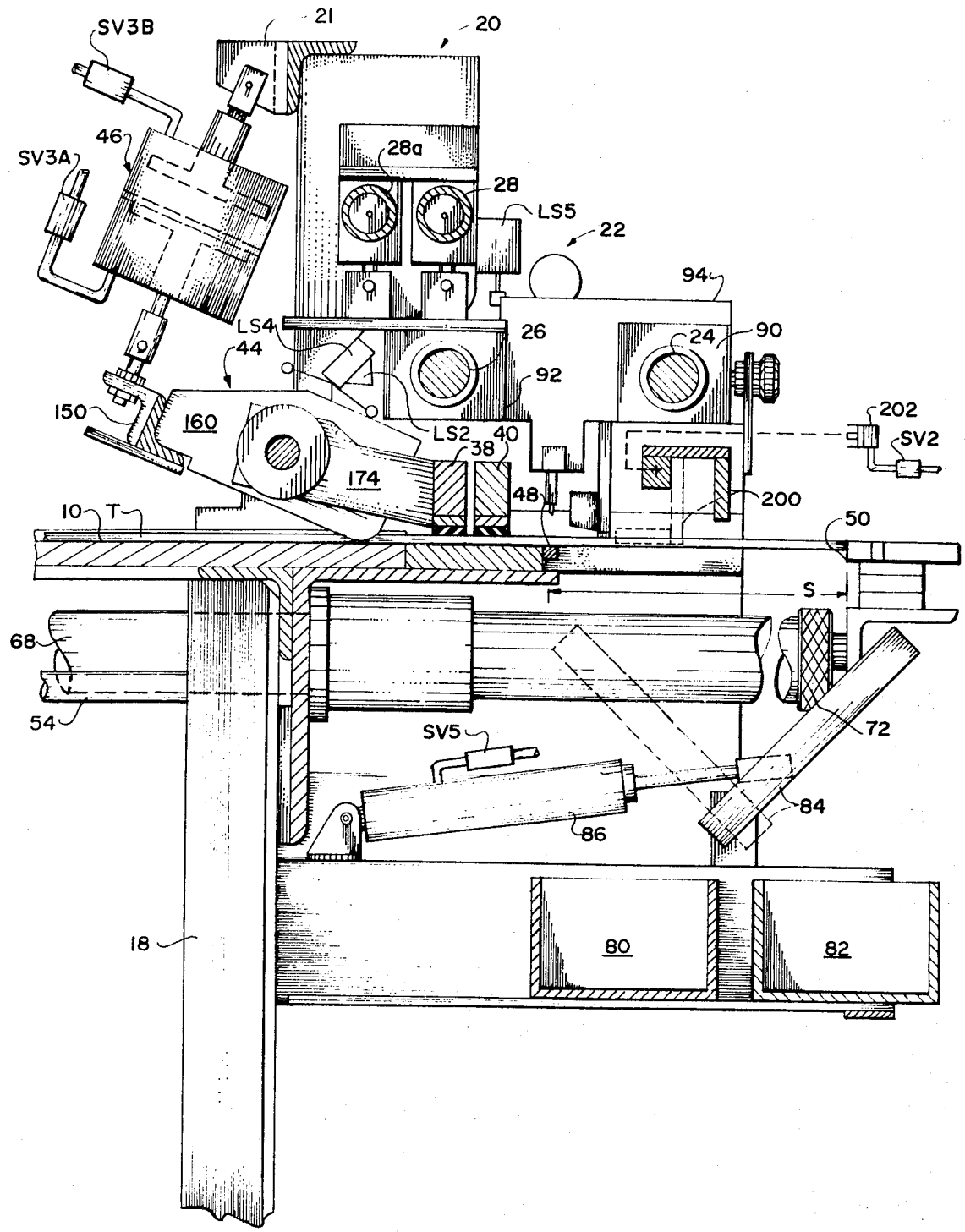
FIG. 4 is a vertical sectional view taken on the line 4—4 of FIG. 2.

Means is provided for feeding the lengths of tubing in a downstream direction, toward the right in FIG. 3, across an anvil 48 located at the downstream edge of the horizontal bed 10 and against a measuring stop 50 located in a predetermined downstream position with respect to the anvil, as indicated at S. FIG. 4 shows the anvil 48 in vertical section, and shows the measuring bar 50 in its "at size" position, located a distance S downstream of the anvil. The glass tubes, indicated generally at T, are adapted to be fed horizontally toward the right in FIG. 4 across the anvil 48 and against the stop 50 provided for this purpose in order to position the tubes for scoring and breaking. The mechanism for feeding the tubes includes a tandem cylinder combination 46, one end of which is connected to the fixed bridge structure 20, and the lower end of which tandem cylinder 46 carries a cross member 150. The member 150 is in turn connected to left and right-hand pairs of bell crank assemblies, 44 and 42, one pair of which is shown in FIGS. 9, 10 and 11. The operation of the bell crank assemblies will be described in greater detail with reference to FIGS. 12 through 19, but for present purposes it should be noted that with the tandem cylinder 46 located as shown in FIG. 4 feed bars 38 and 40, associated respectively with the pairs of bell crank assemblies 42 and 44, are adapted to be oscillated with respect to one another so as to feed the glass tubes T in a downstream direction from left to right as viewed in FIG. 4 and across the anvil 48 and against the measuring bar 50.

As best shown in FIGS. 1 and 3, the measuring bar 50 is movably mounted in the frame of the machine, having its left and right hand ends carried by guide rods 52 and 54 respectively. The guide rods 52 and 54 are slidably received in guide bearings located outboard of the longitudinally extending guides 12 and 14, and two of the four guide bearings are shown in FIG. 1 at 56 and 58. The guide rods, 52 and 54, extend longitudinally of the machine outside of the bed area 10 and carry at their rearmost ends, a cross member 60. The cross member 60, together with the guide rods 52 and 54, and the measuring bar itself 50 comprise a rectangular frame which is supported for slidable movement in the direction of movement of the glass tubes T on the bed 10. This frame is movable from the solid line position, shown in FIG. 1, to the broken line position shown in that view by means of an air cylinder 62 provided in the fixed frame of the machine. The cylinder 62 is operated by solenoid valve SV4B and SV4A through control circuitry described in greater detail hereinafter. A movable part 64 of the air cylinder is connected to the midpoint of the cross bar 60 of the rectangular frame to permit movement of the frame.

Means is provided for presetting the stop position of the measuring bar 50, that is for varying its solid line position shown in FIG. 1, in order to produce glass tube segments of predetermined lengths such as the length S shown in FIG. 4. Preferably, said means comprises a pair of stop shafts, 66 and 68, each of which is mounted in the slide block supports 56 and 58 respectively, associated with movable guide rods 52 and 54. The forward end portions of these stop shafts 66 and 68 are provided with knurled adjustment nuts 70 and 72, which nuts can be locked against one another to provide a stop for the measuring bar 50 as it moves aft in the direction of the arrow 74. The air cylinder 62 is controlled by a solenoid valve SV4B for movement of the stop 50 to the solid line position, referred to herein as the "at size" position. The broken line position shown in FIG. 1 for the measuring bar 50 comprises a "size plus clearance" position suitable for allowing the cutter 22 to score and to break the glass tubes without interference with such measuring bar 50, and this position is achieved by energizing solenoid SV4A whereby the measuring bar 50 is moved to its extended position clear of these tube segments. The rear ends of the stop shafts 66 and 68 also carry knurled nuts, indicated generally at 76 and 78 respectively, for engagement with portions of the cross bar 60 to determine this "size plus clearance" position.

As best shown in FIGS. 3 and 4, hoppers or bins are provided immediately below the space between the measuring bar 50, when it is "at size" and the anvil 48, for receiving the tube segments severed by the cutter wheel on the carriage 22. Two bins are utilized one of these bins 80 serving to receive the tube segments of length S as shown by the position of the deflector 84, and the other bin 82 being provided to receive scraps or the like formed as a result of squaring off the tube lengths prior to cutting them to the desired length S. The deflector 84 is movable from the position shown, to the broken line position shown, by an air cylinder 86 through a solenoid valve SV5. The air cylinder 86 is air operated to the "accept" position shown in solid lines, that is for receiving tubes of length S in the bin 80, and is spring returned to the "reject" position shown in broken lines in FIG. 4.

Figure 5:
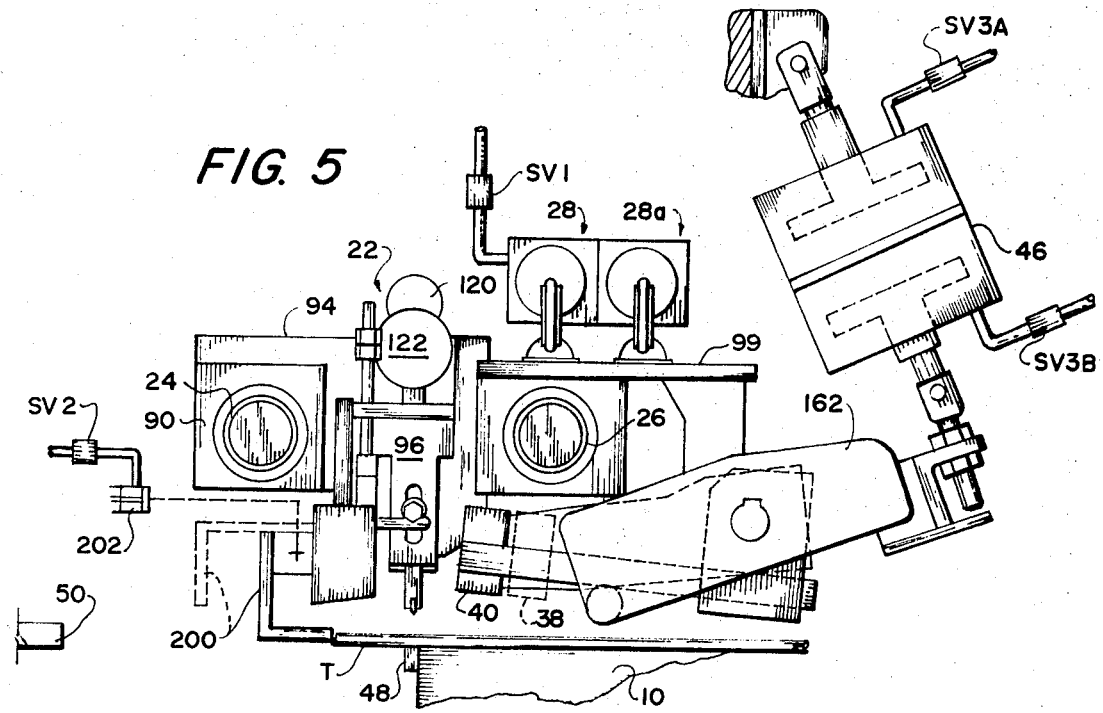
FIG. 5 is a view similar to FIG. 4 showing the feed bars after they have been moved from their operating position, depicted in FIG. 4, to a raised or inactive position.
Figure 6:
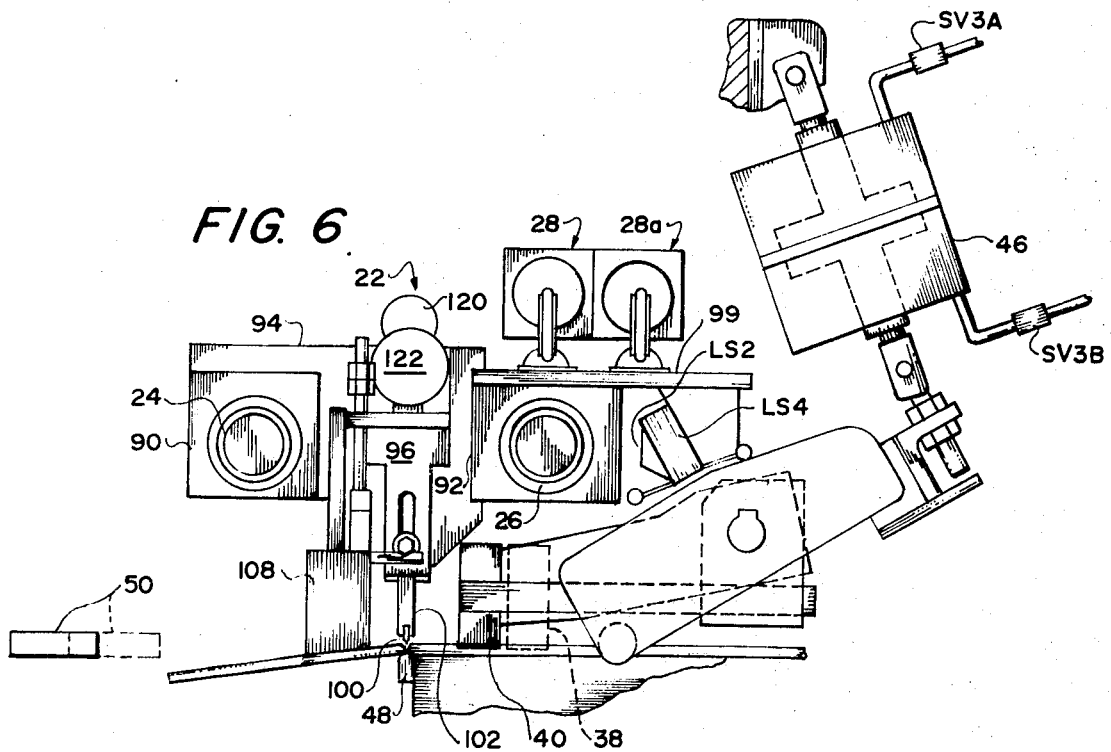
FIG. 6 is a view similar to FIG. 5 but shows the feed bats in their clamped position, and shows the cutter wheel and breakoff shoe in position for scoring and breaking the glass tubes.

The carriage 22 for scoring and breaking the glass tubes T as it passes from its start of cut SOC position to its end of cut EOC position is shown to best advantage in FIGS. 5, 6 and 7. FIG. 5 shows the carriage with the scoring wheel and breaker shoe in their raised positions, FIG. 6 shows the scoring wheel and breaker shoe in their active positions, and FIG. 7 shows the carriage with the scoring wheel and breaker shoe in both positions, the active or cutting position being shown in full lines and the inactive or raised positions being suggested by the broken line positions of these elements. As mentioned above, the carriage 22 is slidably supported on fixed guide rods 24 and 26 located in the fixed frame of the bridge structure 20, and slide bearings 90 and 92 are provided in the carriage 22 for slidably receiving these guide rods as shown in FIG. 7. These slide bearing blocks 90 and 92 are connected to one another by a cross member 94, which cross member 94 includes a depending support 96 and a trailing projection 98 which supports the cutter wheel and breaker shoe so that the latter elements are movable to and from their active positions. The cutter wheel 100 is conventionally provided in a pillar post 102 which post is in turn fixed to a free end of a lever 104. The pivoted end of the lever 104 is provided on a rock shaft 106 mounted in the lower end of the depending support 96. The breaker show 108 is provided on a support 110 which support is mounted to the free end of a lever 112. The lever 112, like the lever 104 for the cutter wheel, is pivotally supported at its opposite end on a rock shaft 114 provided for this purpose in the depending support 96 immediately above the rock shaft 106 associated with the cutter wheel lever 104. The cutter wheel lever 104 is biased toward the solid line position shown, namely its active position, for scoring the upper sides of the glass tubes by a spring loaded plunger indicated generally at 116. The breaker shoe lever 112 is also biased, but only due to its own weight. A knob 120 permits the force on the cutter wheel to be preset. The breaker shoe 108 is biased downwardly by its own weight, although a spring could be utilized for this purpose as with the cutter wheel 117 in the assembly 116. Stop means is provided for determining the down position of the breaker shoe 108, and said means comprises a vertical screw 134 which carries adjustment nuts 136, 136 for engagement with the upper surface of the projecting support 98 for determining the down position of a breaker shoe 108. In FIG. 7, these nuts are not shown in engagement with the upper surface of the projecting support 98 because the cutter wheel 100 and breaker shoe 108 are shown in position for scoring and breaking glass tubes T on the anvil 48.

Still with reference to FIG. 7, and to the cutter carriage 22 utilized to score and break the glass tubes located on the bed 10, these tubes extend across the anvil 48 against the measuring bar 50, and means is provided in conjunction with the fixed bridge structure 20 for latching both the cutter wheel lever 104 and the breaker shoe lever 112 in their inactive or raised positions during travel of the cutter 22 from its start of cut (SOC) to its end of cut (EOC) position. Preferably, said means comprises cam means (not shown) on the bridge structure, and also a latch lever 124 provided on the carriage 22, and more particularly pivotally mounted to the projecting support 98 and depending therefrom with a slot 126 being provided to receive a pin 128 in the lever 112 when the lever 112 is raised upwardly by the above-mentioned cam means. This is accomplished just prior to the start of cut (SOC) position, during return travel of the carriage under the influence of the solenoid valve SV1. The cutter wheel lever 104 is similarly raised through the plunger 130. Upward pivotal movement of lever 112 also causes upward movement of the pin 128 and of the plunger 130. The plunger 130 has a lower head 132 which engages lever 104 and latches it in the up position in a manner similar to that of the lever 112.

FIG. 8 is a diagrammatic study of the development of the forces imposed by the cutter wheel on the glass tubes. The scoring wheel 100 is urged downwardly by the spring 117 with a sufficient force $\overline{OV}$ so that at least 60° on the periphery of the tube to be scored is actually cut as indicated generally by the sum of the angular displacements 138, 138. More particularly, this angular travel of the cutter wheel 100 around the surface of the glass tubes T is provided with equal segments of 30° on each side of top dead center where the tube feels only a force $\overline{OV}$. It will be apparent that the radial force of the cutter wheel 100 acting on the glass tube T is greatest on initial contact, and diminishes so as to equal the vertical force $\overline{OV}$ due to the spring at top dead center, and diminishes further as the cutter wheel rolls from top dead center to its departure point. The fracture so developed in the tube T is therefore deepest at the start of score for each individual tube, and diminishes as the cutter wheel rolls over the tube. Physically, the centroid, or medial position of the fractured area, is always to the right of the vertical when the scoring is carried out from right to left. The breaker shoe 108 is preferably so oriented and so arranged that its force is also along a radial line passing through this centroid. That is, the bottom surface of the breaker shoe is preferably tangential to the tube surface at the location of this line as shown at 140 in FIG. 8. The force diagrams indicated generally at 142 and 144 merely show the reduction in force between the cutter wheel and the glass tube being scored as this force varies from a maximum, $[\overline{OC} + \overline{OD}]$ as shown at 142, through $\overline{OV}$ at the vertical position, and decreasing to $[\overline{OC} - \overline{OD}]$ as it leaves that particular tube. It should also be mentioned in conjunction with the force diagrams in FIG. 8 that the anvil 48 is preferably of steel so as to provide a very rigid backup under the tubes being scored. It is also important that this anvil be convex in its upper contour, and that the scoring edge of the cutter wheel 100 remain directly over the center line of this anvil throughout its travel from start of cut to end of cut (SOC to EOC). The plane of rotation of the wheel must coincide with a vertical plane passing through the vertical center line of the convex anvil. The convex contour for the anvil 48 provides a bottom reaction or controlled line of bend during the breaking of the tube by the break shoe 108. Assuring that the above conditions are met gives optimum results in terms of squareness of the resulting break.

As mentioned above, air driven means is provided for moving the carriage from end of cut EOC to start of cut SOC, and as best shown in FIGS. 5 and 6 the cable type actuator for accomplishing this motion is indicated generally at 28. An oil filled cylinder 28a similar to the actuator 28 is provided alongside the actuator and serves to adjust the speed of movement of the carriage 22 as it moves from start of cut SOC to end of cut EOC. More particularly, the carriage is adapted to move at high speed from end of cut to start of cut, (EOC – SOC) and to move much more slowly during the actual scoring operation (SOC – EOC). This is accomplished by providing the oil filled cylinder 28a alongside the actuator 28 and utilizing it as an damper of dash pot when the carriage moves in the cutting direction. Both actuators are similar, having internal pistons connected to a cable passing over pulleys provided at either end of the bridge with the lower end of the cable being provided outside of the housing in both cases and connected to the carriage 22, and more particularly to an upper plate 99 on said carriage.

Turning now to a more complete description of the means for feeding the lengths of glass tubes T,T horizontally from left to right in FIG. 4, FIGS. 9, 10, 11, and 12 – 19 inclusively, show the tube feed bars 38 and 48, as well as the mechanism for achieving motion of these bars. As mentioned above, these feed also serve to clamp the glass tubes in position against the measuring bar 50 to permit the carriage 22 to move the cutting wheel and breaker shoe across the bed for scoring and breaking these tubes. FIG. 5 shows the tandem cylinders 46 in their extended positions so as to raise both feed bars 38 and 40 upwardly away from the bed 10 and the tubes T. FIG. 6 shows the tandem cylinders 46 in their retracted positions for lowering both measuring bars 40 and 48 downwardly against the glass tubes T clamping them for operation of the cutter wheel 100 and the breaker shoe 108. As brought out hereinafter the measuring bar 50 is retracted to a "size +(plus) clearance" between the ends of the severed tubes and said measuring bar 50 during this cutting operation. Finally FIG. 4 shows the tandem cylinders 46 with the upper piston extended and the lower piston retracted in response to de-energizing solenoid valve SV3A and energizing solenoid SV3B with the result that the measuring bars 40 and 38 are provided in their operative position for feeding the glass tubes T horizontally toward the right against the measuring bar or stop 50 located "at size" position.

As shown to best advantage in FIG. 4, these tandem cylinders 46 are located in mechanical series with one another, the movable part of the upper actuators being connected to the bridge structure 20 and more particularly to the cross member 21 thereof, while the movable part of the lower actuator is connected to a cross member 150 extending across and over the bed portion 10 of the machine. The fixed parts of these tandem actuators are connected to one another.

The opposite end portions of the movable cross member 150 are connected to left and right hand sets of bell crank assemblies, 42 and 44, one of said sets being shown in FIG. 9. FIG. 9 is a detailed view of one end portion of the cross member 150 and of the two feed bars 38 and 40, the other end being similarly constructed.

Still with reference to FIG. 9, the bell crank assemblies 42 and 44 are pivotally mounted on a rock shaft 152, which rock shaft is journaled at either end in the fixed frame of the bridge structure 20, and is adapted to being oscillated about the axis 164 between predetermined angular positions through a sprocket 154. As shown in FIG. 3, the sprocket 154 is driven by a chain 156 from a driven sprocket 158 provided for this purpose on the output shaft of a drive motor N. The bell crank assemblies 42, 44, are arranged in sets, or pairs, on either side of the machine. Each such assembly comprises a pair of side plates or arms 160, 160 and 162, 162 provided on either end of the cross bar 150 and rigidly connected thereto as best shown in FIGS. 10 and 11 at 167 and 169 respectively. As so constructed and arranged, up and down or vertical movement of the cross bar 150, in response to the tandem cylinder combination 46, is adapted to pivot these arms 160 and 162 about the center line 164 of the shaft 152. The center line of the shaft 152 is indicated by the mark provided at the center of the ball bearing race 166 in FIGS. 10 and 11.

The feed bars 38 and 40 are provided on these bell crank assemblies 42 and 44 respectively, and the connection between the bats and these assemblies is such that these bars follow a walking motion to alternately engage the glass tubes so as to advance them in the downstream direction or from right to left as viewed in FIGS. 12 through 19 inclusively. The feed bars are so operated when the tandem cylinder combination 46 is in the FIG. 4 position and motor M is energized. To provide this motion, the feed bars 38 and 40 are pin mounted 168 to the free end of slide bars 170 and 172 associated respectively with the pairs of plates 160 and 162. The measuring bars 38 and 40 are also fixed to the free ends of crank arms 174 and 176 respectively, which crank arms are in turn pivotally mounted on associated shafts 178 and 180 respectively. These shafts 178 and 180, associated with the feed bars 38 and 40 respectively, are rotated on associated center lines, 182 and 184 respectively, which center lines are eccentrically arranged on opposite sides of the center line 164 associated with the drive shaft 152. The eccentric shafts, 182 and 184 associated respectively with feed bars 38 and 40, are keyed to slide blocks, 186 and 188 respectively, and as a result of this geometry each of the feed bars is adapted to follow a generally circular path as suggested in FIGS. 12–19. These paths are so timed with respect to one another that the lower end of said feed bars are adapted to walk the glass tubes T, T horizontally toward the left as viewed in FIGS. 12 through 19. The lower end of each feed bar 38 and 40 is preferably provided with a sponge rubber pad or the like in order to provide the desired degree of resiliency consistent with this feeding motion. The crank arm 174 together with the slide bar 170 and the eccentric shafts 182 and 184 associated with the crank arm 174 and slide block 186 are shown schematically in FIGS. 12 and 19 in order to illustrate the motion of the feed bar 38 through one cycle of its operation. The roller bearing 190 is provided to engage the underside of the slide bar 170, being carried by the plates 160, 160 to impart the desired vertical movement to the feed bars. It will be apparent that the motion of the other feed bar 40 is similar to that of the feed bar 38, shown in FIGS. 12 through 19, and a second roller 192 provided between the plates 162, 162 is provided to impart the same vertical component to said feed bar 40. As a result of this geometry it will be apparent that the glass tubes T, T are walked toward the stop bar 50 in order to provide the feeding means for the machine described above.

It will be apparent that when the feed bars 38 and 40 are arranged as shown in FIG. 12, that is at their initial position, these feed bars can be simultaneously lowered against the glass tubes T, T to clamp them during the scoring and breaking operation. This clamping function of the feed bars 38 and 40 is provided through the tandem cylinders 46 simultaneously energizing solenoid valves SV3a and SV3b, through the control circuit to be described with reference to FIG. 20, permits the feed bars 38 and 40 to assume the clamping position shown in FIG. 6. It will also be apparent that de-energizing both the solenoid valves SV3A and SV3B causes both pistons in the tandem cylinder 46 to extend, rotating the side plates 160 and 162 in a clock-wise direction as viewed in FIG. 5, raising both measuring bars 38 and 40 upwardly to their inactive positions. With the measuring bats 38 and 40 in their inactive positions as shown in FIG. 5, and with the cutter carriage 22 in its latched position, that is with the cutter wheel and breaker shoe raised upwardly as shown in FIG. 5, a square end stop 200 is adapted to be rotated downwardly from the broken line "up" position shown to the solid line position in that view in order to provide the operator of the machine with a convenient means for squaring off the ends of all of the tube lengths prior to initiating an automatic mode of operation of the machine to be described. The square end stop 200 is rotatable through 90° by an air cylinder 202 the operation of which is controlled by a solenoid valve SV2 to be described in greater detail with reference to FIG. 20.

Figure 20:
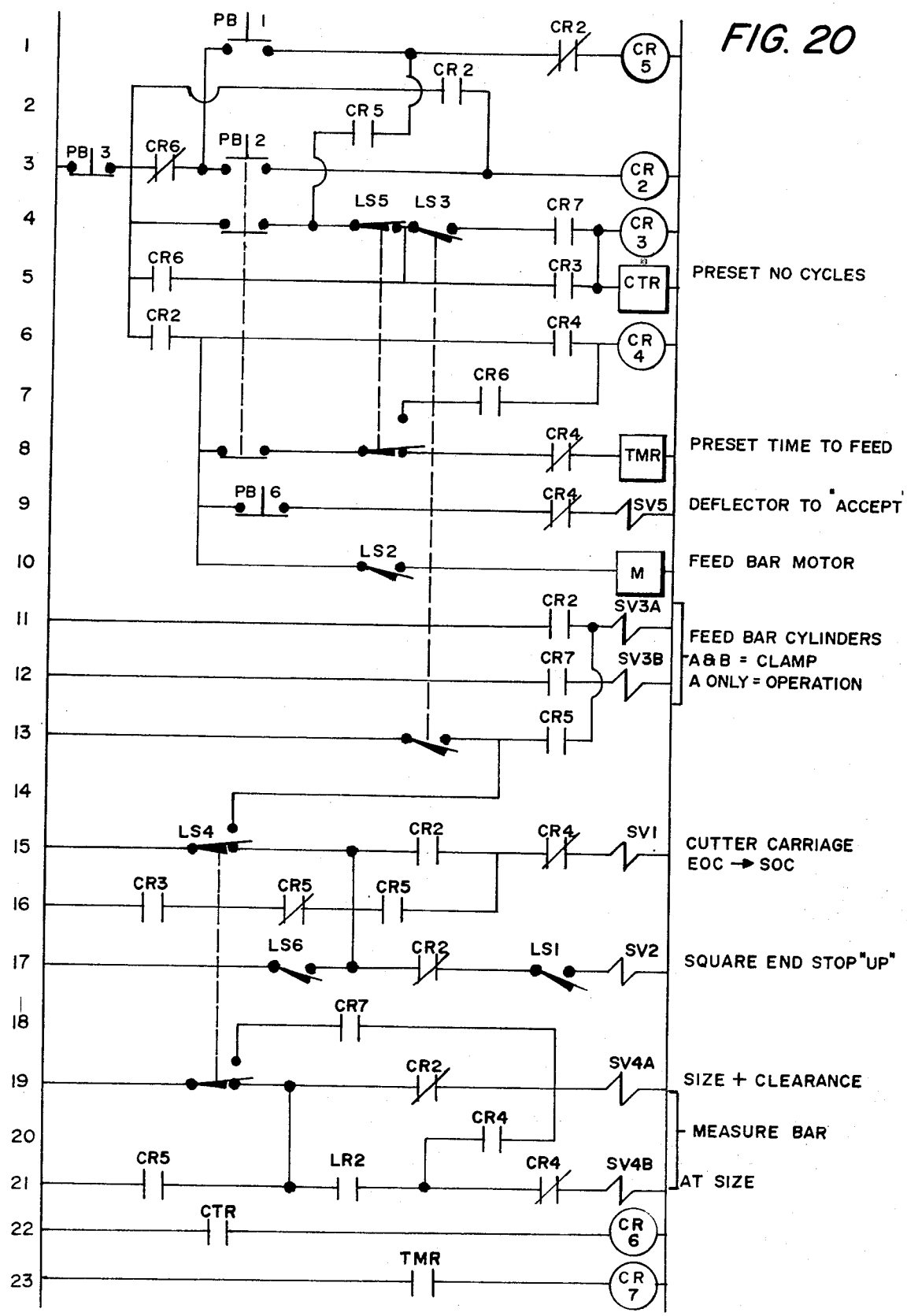
FIG. 20 is a schematic control circuit suitable for use in operating the machine of FIG. 1 in its automatic mode.

Turning now to the operation of the above described machine, and referring more particularly to FIG. 20, prior to cutting of the tube lengths into segments of required length, a first or squaring cut must be made so that the first series of segments have good quality ends. The squaring end stop 200 described above is normally down, as shown in FIG. 5, and is rotated through 90° to the "up" position shown in solid lines in FIG. 4 by the solenoid valve SV2. The lower end of the squaring end stop 200 is set at a fixed distance from the anvil 48 so as to remove a minimum length of tube consistent with producing a square end on all of the tubes provided on the bed. The length of the segments determined by the position of the measuring bar may be greater or less than this initial square end length, and the measuring bar is movable from an "at size" position to a "size plus clearance" to provide clearance for rotating the square end stop through the 90° position shown. The L-shaped configuration of the square end stop 200 provides a minimum distance from the anvil 48. The tandem cylinder 46 has a normal configuration which extends both its pistons, as shown in FIG. 5, to raise the measuring bars 38 and 40 to their inactive positions. These feed bars are adapted to be moved either to the position described above for operating the feed bars, only solenoid valve SV3A being energized as shown in FIG. 4, or where both solenoid valves SV3A and SV3B are energized the measuring bars assume a clamped position best shown in FIG. 6.

The operator of the machine will therefore have the squaring end bar down and the feedbars up as shown in FIG. 5 in order to permit him to accomplish the squaring end cut required to provide a square edge on all of the tubes prior to initiating the automatic sequence to be described. The deflector 84 is normally in the "reject" position shown in broken lines in FIG. 4, and energizing the solenoid SV5 will cause movement of the air cylinder 86 to move the deflector 84 to the "accept" position shown. The operator loads the bed 10 with a layer of glass tubes, and manually pushes these tubes in the downstream direction over the anvil 48 into contact with the square end stop 200. He then presses the square end cut push button PB1, and normally closed contacts CR2 on line 1 of the schematic shown in FIG. 20 energize relay CR5. Normally open contacts CR5, in line 2, latch relay CR5 closed even when push button PB1 is released. Limit switch LS4 (normally closed) in line 15, and normally open contacts CR5 in line 16, through the normally closed contacts CR4 in line 15, energize the solenoid valve SV1 which controls operation of the cutter carriage 22. This carriage is normally provided at the end of cut EOC position described above, and energizing of solenoid valve SV1 causes the carriage to move from its end of cut EOC to its start of cut SOC position with the cutter wheel and breakoff shoe raised by the latching mechanism described above.

As the carriage reaches the start of cut SOC position, the cutting wheel and breaker shoe unlatch, as described above, and the limit switch LS3 (normally open) in line 13 of FIG. 20 will close. The closed contacts of relay CR5 in the same line thereby energize solenoid valve SV3A in line 11. This solenoid valve SV3A causes the feed bar cylinder 46 to clamp the feed bars 38 and 40 against the tubes T, T on the bed 10, and limit switch LS4 will open when the feed bars reach this clamped position.

When limit switch LS4 in line 15 opens solenoid valve SV1 is de-energized permitting the cutter carriage to move from its start of cut (SOC) position to its end of cut (EOC) position scoring and breaking the glass tubes. At end of cut EOC the carriage will have its cutter wheel and breakoff shoe raised once again by the camming action caused at this position as described hereinabove.

Considering next the automatic mode of operation of the machine, all of the tube lengths are sequentially fed against a measuring stop and sequentially cut by the cutter carriage, followed by further feeding of the tubes against the measuring stop and further cutting until a predetermined time, or number of cycles, has elapsed. This mode of operation will also be described with reference to FIG. 20.

Push buttom PB2 has normally open contacts, as shown in line 3, and these contacts are momentarily closed to initiate the automatic mode of operation of the machine. It will be apparent that the momentary closing of these contacts energizes relay CR2, which relay is held energized by latching contacts CR2 in line 2 of FIG. 20. Limit switch LS4 (normally closed) located in line 19, together with normally open contacts CR2 located in line 21, and normally closed contacts CR4 in the same line, energize solenoid valve SV4B. Solenoid valve SV4B controls actuator 62 which moves the measuring bar 52 to a predetermined "at size" position. Normally closed limit switch LS5 in line 8 causes a timer TMR, which has been preset to some predetermined time, to start up. The deflector 84 will have been moved to its "accept" position for accepting good segments of glass tubes, since normally closed push buttom PB6, and normally closed contacts CR2 in line 6 are closed.

Solenoid valve SV3A associated with the tandem feed bar positioning cylinders 46 will be energized through contacts CR2 in line 11 moving the feed bars to their "operate" position. As the feed bars reach their "operate" position, normally open limit switch LS2 in line 10 of FIG. 20 closes energizing the motor M associated with rotation of the shaft 154 on which the feed bars are rotatably mounted for achieving the walking motion described hereinabove with reference to FIGS. 10 through 19 inclusively. This walking motion of the feed bars continues until expiration of the preset time in the timer TMR. When the timer TMR times out, contacts TMR in line 23 close energizing relay CR7. The time preset in the timer TMR is associated with the length of tube segment desired, and it will be apparent that this parameter can be set in the timer TMR to fulfill any particular tube segment length requirement. Contacts CR7 in line 12, and CR2 in line 11, energize both solenoid valves SV3A and SV3B respectively, moving the feed bars to their clamp position. It should also be noted that simultaneously with movement of the measuring bar to its "at size" position as described above, the cutter carriage 22 will move from its end of cut EOC position to its start of cut SOC position as a result of closing of the contacts CR2 in line 15.

As the feed bars reach their clamped position, normally closed Limit Switch LS4 opens energizing solenoid valve SV1, through contacts in line 14, thereby causing the carriage to move from its start of cut SOC position to its end of cut EOC position to score and break the glass tubes. From line 19 of FIG. 20 it will also be apparent that limit switch LS4 has additional contacts which also open and serve to move the measuring bar to its "size plus clearance" position as soon as contacts CR7 close, that is after feeding of the tubes as described above.

At its start of cut SOC position, or more particularly as the carriage leaves this position, the cutter wheel and breaker shoe will be lowered so as to accomplish the scoring and breaking. The measuring bar will have been moved to "size plus clearance" position so as not to interfere with this operation. Just prior to the end of cut EOC position, and only during motion in the cutting direction, limit switch LS5 opens momentarily so as to recycle the timer TMR. Opening of this limit switch LS5 in line 8 will cause momentary closing of a set of contacts in line 7 but normally open contacts CR6 prelude energizing relay CR4 until the end of the predetermined number of cycles of operation of the times as preset in a counter CTR located in line 5.

Still with reference to closing of timer contacts TMR in line 23, and energizing of relay CR7 in the same line, contacts CR7 in line 12, although closed momentarily as the timer is recycled, will reopen when the timer is recycled, de-energizing solenoid valve SV3B and causing the feed bars to assume their "operate" position. Limit switch LS 2 will be closed by movement of the feed bars to their operate position starting feed motor M and the glass tubes again are walked downstream across the anvil for producing a second batch of tubes of similar length to those formed on the first cycle of operation. Limit switch LS5, since it is so arranged as to be momentarily closed just prior to end of cut EOC, reopens, causing the timer to be recycled in order to achieve the desired sequential mode of operation.

On the last cycle in the automatic mode of operation of the device, the counter CTR, which has been preset to the desired number of cycles as described above, will count down to the preset number, ultimately closing contacts CTR in line 22, and energizing relay CR6. Limit switch LS5 opens momentarily just prior to end of cut EOC on the last cycle, causing relay CR4 in line 6 to be energized through contacts CR6 in line 7 associated with the limit switch LS5 in line 8. Normally closed contact CR4 in line 8 will then be left open precluding the timer TMR from recycling. The defelctor 84, operated from solenoid valve SV5, will also be de-energized and moved to its "reject" position due to normally closed contacts CR4 being opened as described above. The cutter carriage 22 will remain at its end of cut EOC position due to still another pair of normally closed contacts CR4 in line 15 being open. Normally open contacts CR4 in line 20 will close, energizing solenoid valve SV4A but solenoid SV4B will be de-energized. The measuring bar, therefore, assumes its "at size plus Clearance" position.

The feed bars 38 and 40 continue to feed until push button PB3 is momentarily depressed de-energizing relay CR2. Relay CR4 is also de-energized at the same time, and the various components of the machine assume their normal, or initial, positions. The feed bars are raised through de-energizing of solenoids SV3A and SV3B and the tandem cylinder 46 assumes the position shown in FIG. 5. The cutter carriage 22 remains at its end of cut EOC position when solenoid valve SV1 is de-energized. The square end bar moves down to its normal position as solenoid valve SV2 is de-energized. Limit switch LS1 is normally open, but will be closed because the measuring bar is extended. The machine is therefore ready for receiving a second batch of tubing lengths on the bed 10.

I claim:

1. A machine for scoring and breaking a plurality of side-by-side elongated glass members to provide segments of predetermined length, said machine comprising a fixed frame including a bed for supporting the glass members in side-by-side relation, an anvil adjacent a downstream end of said bed, means for feeding said glass members longitudinally downstream across said anvil, stop means provided in spaced parallel downstream relation to said anvil for stopping the glass members in their feeding movement, a carriage having scoring means and breaking means provided thereon, means for traversing said carriage in one direction across the glass members to first score them at said anvil location and to also break them during said carriage traversing movement in said one direction.

2. The machine defined in claim 1 further characterized by means for timing said feeding means and said carriage traversing means to move the carriage in a return direction when said glass members are fed toward said stop means, said feeding means also serving to clamp the glass members during movement of said carriage in said one direction.

3. The machine defined in claim 2 further characterized by means for retracting said stop means during movement of said carriage in said one direction to provide clearance between said stop means and the segments being broken, and means for collecting the glass member segments so broken.

4. The machine defined in claim 2 wherein said feeding means comprises at least one feed bar oriented parallel to the direction of movement of said carriage and having a lower surface adapted to frictionally engage the glass members on said bed, means for imparting a walking motion to said feed bar whereby said bar is moved downwardly and then in a downstream direction and returns to a starting position in a cyclical fashion to feed the glass members incrementally downstream as aforesaid.

5. The machine defined in claim 4 wherein said feeding means further includes a second feed bar adjacent said one feed bar, and second means for imparting a walking motion to said second feed bar, which second means is so related to said first mentioned walking motion means that these feed bars act successively upon said glass members.

6. The machine defined in claim 5 further characterized by left and right hand bell crank assemblies for each of said feed bars, and means for eccentrically mounting said bars to its associated bell crank assembly to achieve this walking motion, and means for movably mounting said bell crank assemblies to the fixed frame of the machine whereby said feed bars can be moved to an operate position for said walking motion and also to clamp position during movement of said carriage in said one direction.

7. The machine defined in claim 3 wherein said anvil has a convex upper surface with its crown spaced slightly above the upper surface of said bed, and wherein said scoring means comprises a class cutter wheel resiliently mounted in said carriage and located above the anvil crown, said carriage traversing means being adapted to move said cutter wheel in said one direction in a vertical plane normal to said anvil crown.

8. The machine defined in claim 7 wherein said breaking means comprises a shoe located downstream of said cutter wheel and independently mounted in said carriage for trailing the cutter wheel in its traversing movement, said shoe having an inclined face for exerting a non vertical breaking force on the glass members which it successively engages.

9. A method for scoring and breaking elongated members of frangible material and comprising the successive steps of:
   a. placing the members on a flat bed
   b. advancing the members in a downstream direction until they contact a stop, which stop is located a predetermined distance downstream of an anvil.
   c. clamping the members to the bed
   d. retracting the stop,
   e. passing a glass cutter across the members above the anvil to score the members, f. passing a break off shoe across the members just downstream of the path of said glass cutter.

10. The method of claim 9 wherein said cutter and breakoff shoe are returned to their initial positions during said member advancing step in an automatic mode of operation, and returning said stop to its predetermined position prior to advancing said members during a succeeding cycle of operation as set forth in claim 9.

* * * * *